Sept. 4, 1962                    C. J. KOESTER                    3,052,152
                          OPTICAL COMPENSATING SYSTEM
Filed March 27, 1959                                          5 Sheets-Sheet 1
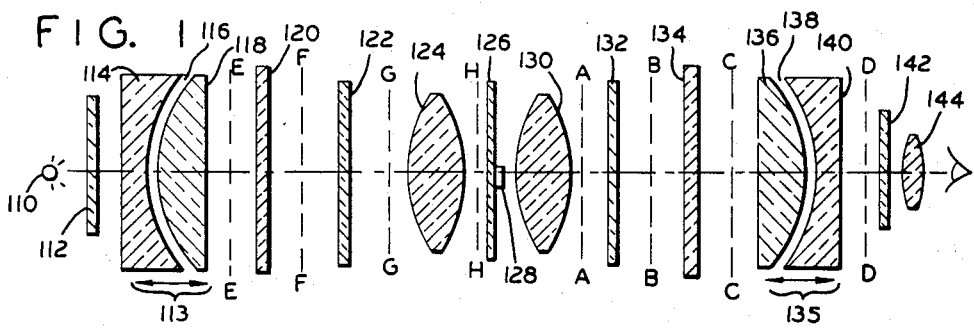
FIG. 1
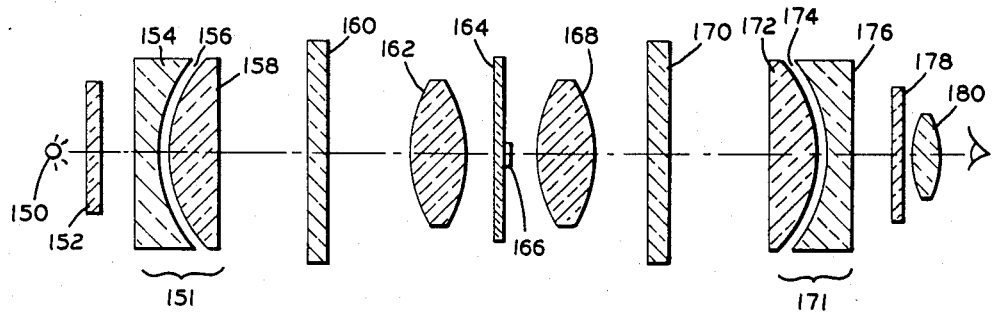
FIG. 2
FIG. 3
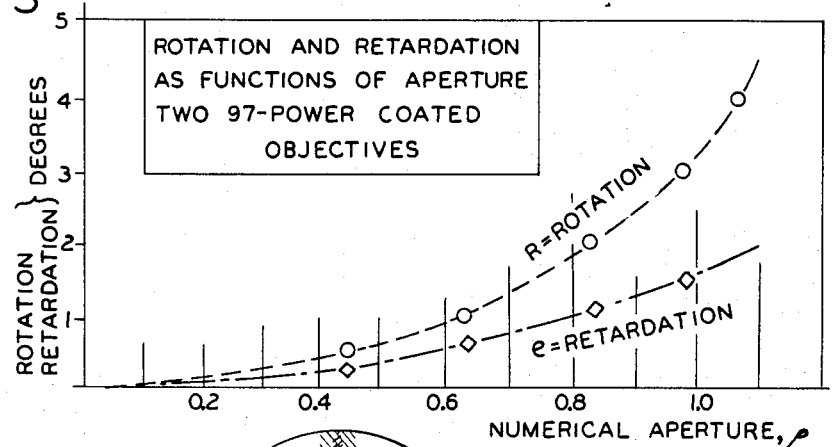
ROTATION AND RETARDATION AS FUNCTIONS OF APERTURE TWO 97-POWER COATED OBJECTIVES
FIG. 4
POLARIZER PLANE
POLARIZATION CROSS
ANALYZER PLANE
INVENTOR.
CHARLES J. KOESTER
BY
BLAIR, SPENCER & BUCKLES.
ATTORNEYS.

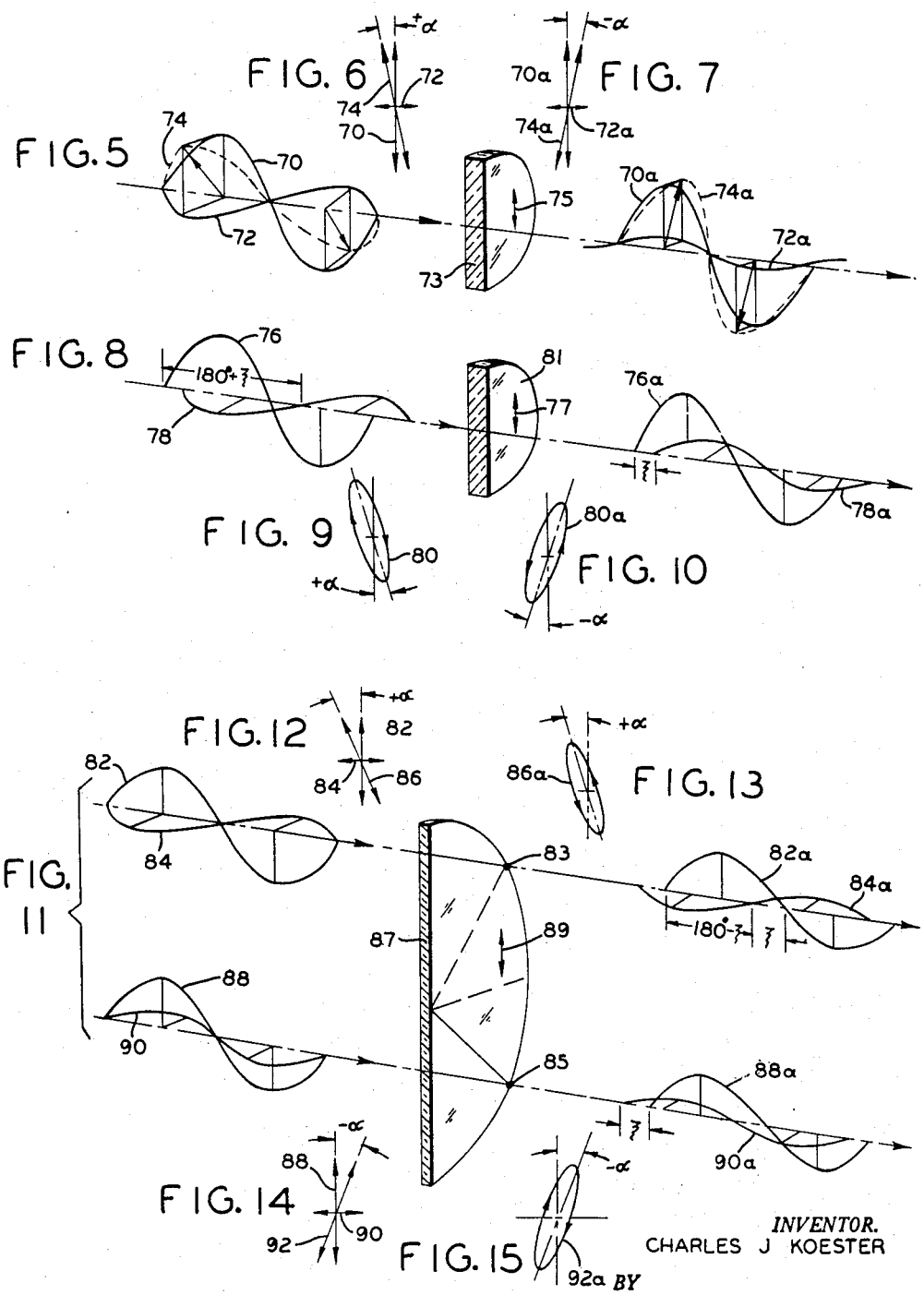

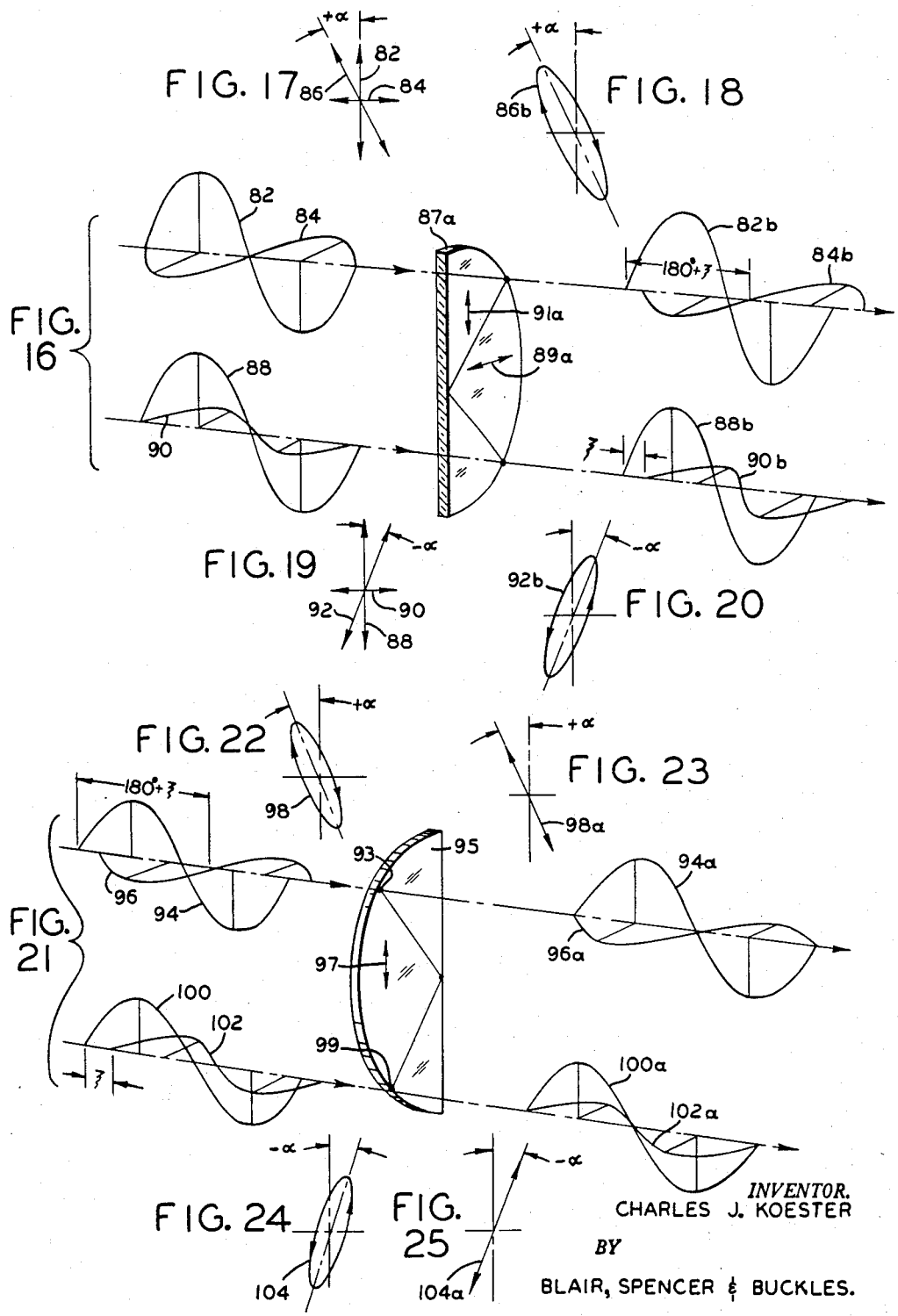

INVENTOR.
CHARLES J. KOESTER
BY
BLAIR, SPENCER & BUCKLES.
ATTORNEYS.

United States Patent Office 3,052,152
Patented Sept. 4, 1962

---

3,052,152
OPTICAL COMPENSATING SYSTEM
Charles J. Koester, Bethesda, Md., assignor to American Optical Company, Southbridge, Mass., a voluntary association of Massachusetts
Filed Mar. 27, 1959, Ser. No. 802,366
22 Claims. (Cl. 88—1)

This invention relates to compensating systems for optical apparatus, and more particularly to optical systems employing polarized light and adapted to compensate for the depolarizing effects of coated optical surfaces.

Polarizing microscopes, combining a polarizer-analyzer combination, or "polariscope," with an optical microscope, have proven useful in many fields. They permit the observation of specimens illuminated by plane-polarized light, and when the polarization planes of the polarizer and analyzer are "crossed," or adjusted to be perpendicular, the analyzer blocks or "extinguishes" the plane-polarized light passed by the polarizer, creating the condition known as "extinction." Anisotropic specimens depolarize the illuminating light to some extent, generally creating colored images showing the structural details of the specimen. By this means, such specimens as crystals may be identified and their optical properties observed. Polarized light is valuable in the study of a great many materials, including chemicals, crystals, minerals, colloidal suspensions, biological fine structures, foods, drugs and textile materials.

In optical systems employing polarized light, such as the various types of polarizing microscopes, the light-modifying elements generally introduce undesirable depolarizing effects, producing stray light and limiting the degree of extinction possible with the system. The inclined surfaces of the various lenses and other optical elements introduce rotation, changing the azimuth of the polarization plane in varying amounts and different directions at various points in the aperture. Furthermore, the low reflection coatings employed on the curved lens surfaces of the condenser and objective introduce varying amounts of ellipticity, further reducing the degree of extinction attainable.

Several polarizing microscope systems are disclosed in the co-pending application of W. L. Hyde and S. Inoué, Serial No. 561,045, which issued as Patent No. 2,936,673 on May 17, 1960, and these systems are well adapted to provide compensation for the rotations introduced by the passage of light through the surfaces of the specimen slide, cover glass, lenses and the like, significantly improving the extinction obtainable with such systems.

The ellipticity introduced by low reflection coatings on the optical surfaces of the elements of such systems constitutes another undesirable source of stray light, not plane-polarized as required. The systems of the present invention compensate for both rotation and ellipticity and are particularly adapted to compensate for the undesired ellipticity introduced by such low reflection coatings.

Accordingly, a principal object of the present invention is to provide optical systems employing polarized light and capable of substantially complete compensation for all undesirable polarization effects. Another object of the invention is to provide optical systems of the above character employing polarized light and capable of substantially complete compensation for both rotation and ellipticity effects. A further object of the present invention is to provide compensating means for optical systems employing polarized light of the above character which are capable of eliminating substantially all rotation and ellipticity introduced by other elements of such systems. Another object of the invention is to provide compensating assemblies of the above character which may be manufactured readily and economically. Still another object of the invention is to provide compensating assemblies of the above character adapted for use with the standard elements of polarizing microscope systems. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic diagram of an optical system incorporating one embodiment of the present invention;

FIGURE 2 is a schematic diagram of an optical system employing another embodiment of the invention;

FIGURE 3 is a graphic chart showing the variation of uncompensated rotary and elliptical depolarization with increasing aperture;

FIGURE 4 is a schematic diagram of the "polarization cross" observed in an uncompensated polarizing microscope when the polarizer and analyzer are "crossed";

FIGURES 5 through 25 are phase vector diagrams showing the effect of various phase retardation plates upon the polarization of light passing therethrough in the present invention.

Similar reference characters refer to similar elements or components throughout the several views of the drawings.

Figure 26:
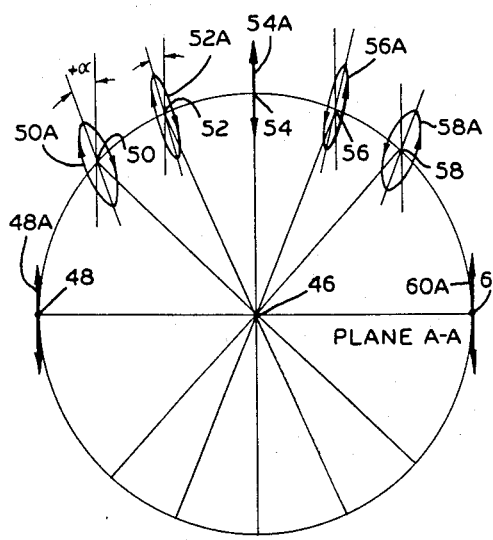
FIGURES 26 through 33 are graphic vector diagrams showing polarization conditions for rays at different points in the aperture in different planes of the system shown in FIGURE 1.

One embodiment of the present invention is shown schematically in FIGURE 1, where light from a source 110 is directed toward a polarizer 112, which is preferably a Glan-Thompson or Nicol prism, although a sheet of transparent polarizing material may also be used as a polarizer. Plane-polarized light from polarizer 112 is directed through a first rectifier group 113, preferably including a low power meniscus lens, such as the air lens 116 formed by elements 114 and 118, fully described in Patent No. 2,936,673 issued on the co-pending application of W. L. Hyde and S. Inoué. The light then passes through a half-wave retardation element 120, and thence through a first retardation plate 122, more fully described below, to a condenser lens system, shown schematically as a single lens 124 in FIGURE 1.

The light from condenser 124 is focused upon a specimen 128 supported by a stage 126, including the necessary slide, cover glass and the like. The light then passes successively through an objective lens system, shown schematically as a single lens 130; a second retardation plate 132, properly oriented as described below; a half-wave retardation element 134; a second rectifier group 135 preferably including elements 136 and 140 forming a lower-power air lens 138; an analyzer 142 which is preferably similar to polarizer 112; and an eyepiece, shown schematically as a single lens 144.

Since the adjacent half-wave retardation elements and retardation plates are preferably both birefringent plates of similar type with optic axes either parallel or perpendicular, their relative positions may be interchanged, or they may be combined by being cemented together, or they may be fabricated as single birefringent plates for ease of manufacture and construction if desired, as shown in FIGURE 2. Here, illumination from source 150 passes through a polarizer 152 and a first rectifier group 151, preferably including elements 154 and 158 forming a low-power air lens 156 therebetween as described above. The illumination then passes through a first phase retarding element 160 to a condenser lens system represented by a single lens 162, which focuses the beam upon a specimen 166 supported on a stage 164. Light from the specimen passes through an objective lens system shown schematically as a single lens 168, and then through a second phase-retarding element 170 and a second rectifier group 171 including elements 172 and 176 forming a second low-power air lens 174. The light then passes through an analyzer 178 to an eyepiece, shown as a single lens 180 in FIGURE 2.

In the system of FIGURE 2, element 160 performs the combined functions of the two elements 120 and 122 in the system of FIGURE 1. Similarly the combined functions of the two elements 132 and 134 of the system of FIGURE 1 are performed by the element 170 in the system of FIGURE 2.

In general a beam of unpolarized light may be regarded as a mixture of many sine-wave vibrations travelling along the axis of the beam, the vibrations being oriented in many planes all containing this axis. A beam of polarized light may be regarded as one such vibration travelling along the beam's axis, oriented in one such plane, the polarization plane. Unpolarized light directed through a "polarizer" or "analyzer" emerges as plane polarized light vibrating only in planes parallel to the "polarization plane" of the polarizer or analyzer.

If a beam of plane polarized light passes through an optical element which introduces rotation, the polarization plane of the beam is thereby shifted or rotated angularly so that the inclination azimuth of the polarization plane is no longer parallel to the beam's original plane of polarization. Such rotation may result from transmission through or reflection from an inclined surface. The plane of incidence of the surface is defined as the plane containing the axis of the beam and the normal to the surface at the point of incidence. When the original plane of polarization does not line in the plane of incidence, the effect of the surface is to separate the incident plane polarized light into two components, one vibrating parallel to the plane of incidence and the other perpendicular thereto. The ratio of transmitted amplitude to incident amplitude is different for these two components. For an uncoated glass surface the two components are transmitted in phase and therefore their resultant is plane polarized light. However, because of the difference in transmittance for the two components, the plane of polarization is rotated relative to the original plane of polarization. The amount of rotation depends on the angle of incidence, the angle between the original azimuth and the plane of incidence, and the difference in indices of the media on the two sides of the surface.

In a lens system, and particularly in a high power microscope objective, polarized light rays passing through different portions of the aperture encounter various angles of incidence and different planes of incidence. Therefore the rotation is different for rays passing through various portions of the aperture. When these rays converge to the image, the analyzer will not be able to extinguish all of the rays simultaneously, due to their different azimuth planes. In effect, the light is therefore partially depolarized at the image.

If the surfaces have thin transparent coatings, often used for the purpose of reducing reflections, then the components parallel and perpendicular to the plane of incidence are transmitted slightly out of phase. Therefore, the resultant polarized light rays are elliptically polarized.

In a lens system the elliptical polarization introduced in rays passing through various points in the aperture is different depending on the angle of incidence and the angle between the incident azimuth and the plane of incidence. This also produces effective partial depolarization in the image.

If the beam's axis is considered horizontal and the original polarization plane is a vertical plane containing this axis, rotation may be regarded as producing two in-phase sine-wave component vibrations, as illustrated in FIGURE 5, one component 70 in the original (vertical) polarization plane, and a normal component 72 in the perpendicular (horizontal) plane containing the axis. The resultant 74 of these two components will be a sine-wave vibration in a plane inclined at an angle $\alpha$ from the original plane of component 70, as shown in FIGURE 6.

If the two components are out of phase, as are components 76 and 78 in FIGURE 8, the resultant of the two components revolves about the axis and changes in length, tracing an elliptical path 80 as shown in FIGURE 9, and producing "elliptically polarized" light, which will be "right-handed" or "left-handed," depending upon whether the phase difference is positive or negative. Thus in FIGURE 11, the component 90a is retarded by $\xi$ with respect to the component 88a, and the resulting ellipse is "right-handed" (FIGURE 15), being generated by a resultant vector revolving clockwise as viewed by the observer, while in FIGURE 16, the component 90b is advanced by $\xi$ with respect to the component 88b, and the resulting ellipse is "left-handed" (FIGURE 20). In the special case (not shown in the figures) when the two components are of equal amplitude and one-quarter wavelength or 90° out of phase, the ellipse becomes a circle and the resultant beam is called "circularly polarized."

Both the rotation and ellipticity are small effects in microscope objectives and condensers. They can be detected and measured only if the lenses are substantially free from strain. Because the elliptical polarization is small, i.e., the ellipse is very long and narrow, it is possible to refer to "rotation" of such light, just as with plane polarized light. Rotation is measured between the major axis of the ellipse and the original polarization plane of the light and it may be said that on passing obliquely through a coated surface, a plane polarized light ray suffers both rotation and elliptical polarization.

Certain "birefringent" crystalline materials, such as calcite and mica, have the property of producing a phase difference between normally plane-polarized incident component beams, for the following reasons. "Birefringent" materials are so named because they are "anisotropic," i.e., their optical properties depend on the angular direction at which the light travels through the crystal. In general, light of a given polarization travels through the crystal at a different velocity than light polarized perpendicularly thereto. In a uniaxial crystal there is one direction along which light of all polarizations travels with the same velocity. This direction is called the optic axis. In biaxial crystals such as mica there are two such directions, and therefore two optic axes.

When a plane parallel plate is cut from uniaxial material, for light incident normally on the plate, there is always one vibration direction which is perpendicular to the optic axis. This direction is then known as the "fast" axis if the crystal has positive birefringence. Perpendicular to this direction is the "slow" axis of the plate. If the crystal has negative birefringence, these axes are reversed. Similarly a plate cut from a biaxial crystal will have a fast and a slow axis. With such plane parallel plates it is convenient to speak merely of the fast and slow axes, or the "principal axes," thus avoiding the use of the terms uniaxial, biaxial, positive birefringence and negative birefringence.

If a ray of plane polarized light is directed into such birefringent material with its incident plane of polarization oriented at an angle of about 45° to the two normal principal axes, the beam may be regarded as divided into two components, each being polarized in a plane parallel to one of the principal axes, and one component will pass through the material more slowly than the other. When the material is a "half-wave" plate, i.e., a plate having a chosen thickness such that the relative retardation of this slower component is equal to one-half of the wavelength of the light, this has the effect of changing or "rotating" the plane of polarization of the emerging light by 90° with respect to the incident plane of polarization.

Similarly, a "quarter-wave plate," with its principal axis oriented at 45° to the plane of polarization of incident plane polarized light, introduces a one-quarter wavelength or 90° phase difference between the two components, thus converting plane polarized light into circularly polarized light.

The undesirable rotations and ellipticities produced by the various elements of polarized light optical systems, such as polarization microscopes, are not uniform throughout the aperture, but vary for rays in different locations over the aperture, as illustrated graphically in FIGURE 26.

The effects described above may conveniently be examined in the rear focal plane of the objective. If the analyzer is set perpendicular to the polarizer, four light areas are seen separated by a dark cross, as shown in FIGURE 4. Accordingly, complete extinction at the back aperture or image plane of the objective of all of the light being transmitted by the polarizer cannot be obtained by the analyzer in crossed relation thereto. This has been the case even though utmost care has been exercised to use strain-free optics in the condenser and in the objective, to use high quality polarizers and analyzers, and even to use substantially monochromatic light of a carefully selected wavelength. When the lenses of the system are completely strain-free, the polarization cross is perfectly symmetrical. If the lens surfaces are uncoated when the analyzer is rotated the cross opens up into two dark V's in opposite quadrants, and these move out symmetrically toward the edge of the field as rotation continues. Rotation in the opposite direction produces V's in the other two opposing quadrants. It is clear from this observation that the light is still plane polarized but has effectively been rotated by various amounts in various parts of the aperture. The degree of rotation thus varies with the numerical aperture of the system and the azimuth angle relative to the polarizer, and the sense of rotation is reversed in adjacent quadrants.

The more steeply sloped the unit surface areas of the transmitting optical elements of a system are in relation to light incident thereon, the gerater will be their rotation effect. Thus, even flat surfaces of transmitting elements of the system, such as a microscope slide and cover glass, having parts thereof receiving light obliquely and at high angles of incidence will likewise contribute to this rotation effect. Because the rotatory effect is of the same sense in both the condenser and objective, it cannot be reduced by the simple expedient of adding lenses to either. Also while at each lens surface it may be small, nevertheless, it is an accumulative condition and becomes quite material and objectionable when a number of refracting surfaces are to be jointly considered; such as is the situation in the case of an ordinary high quality polarizing microscope.

It has been previously proposed to provide low reflecting coatings of controlled thicknesses and proper refractive index on the surfaces of various or all of the light-transmitting elements of such an instrument in an endeavor to lessen this depolarizing effect in the image. While improved results have been obtained in systems using such coatings to reduce reflection losses, the fact still remains that the light in the image plane is partially depolarized and, of course, this tends to reduce the sensitivity or degree of resolution which might otherwise be obtained. The result of such conditions has been, accordingly, that in order to keep the field dark, the microscope must be used at greatly reduced numerical aperture, with the result that its resolving power has also been reduced.

In addition to the rotation produced by the relative inclinations of optical surfaces and the light rays passing therethrough, the same relative inclinations produce ellipticity at the surfaces coated with low-reflection coatings. This is caused by unequal internal reflections within the coating of components respectively parallel and normal to the plane of incidence of each ray, as explained above.

The different amounts of positive rotation and ellipticity introduced by a coated objective lens system are shown qualitatively in FIGURE 26, which is a schematic diagram of a transverse aperture plane, with point 46 indicating the optical axis of the system and points 48, 50, 52, 54, 56, 58 and 60 identifying rays passing near the periphery of the aperture. If the light entering the objective is plane polarized parallel to the vertical plane defined by central point 46 and peripheral point 54, the rays of light emerging from the objective will generally be plane-polarized only along the central line 46—54 and the perpendicular central line defined by the points 48, 46 and 60 in FIGURE 26.

Maximum amounts of rotation and ellipticity will generally be introduced at the peripheral 45° points 50 and 58, as indicated by the ellipses 50A and 58A in FIGURE 26, with the rotation and the phase difference being positive in one quadrant and negative in the adjacent quadrants. Successive rays passing through points closer to the two perpendicular central lines will exhibit successively smaller amounts of both rotation and ellipticity as indicated by the ellipses 52A and 56A, representing the polarization of rays passing through points 52 and 56 respectively in FIGURE 26. The larger amounts of rotation and ellipticity introduced at the peripheral 45° points explains why the crossed analyzer produces the polarization cross shown in FIGURE 4, rather than a perfectly dark field.

If the rotation were perfectly rectified in a commercial polarization microscope employing a pair of strain-free 97-power objectives as condenser and objective, the ellipticity remaining would still limit the extinction factor to about $1.2 \times 10^4$, the "extinction factor" being defined as the ratio of maximum flux to minimum flux transmitted by the analyzer. In order to obtain extinction factors greater than this in such commercial polarization microscope systems, rectification of the ellipticity is necessary. As stated above, the compensation means of the present invention are adapted to compensate for both rotation and ellipticity introduced by the lens systems of the instrument, reducing the amount of stray light and thus increasing the degree of extinction. The effectiveness and usefulness of such optical systems as polarization microscopes are thus significantly enhanced.

In the system of FIGURE 1, the "positive" rotation and ellipticity introduced by condenser 124, objective 130 and the other elements of the system are compensated by the combination of elements incorporated in this embodiment because the air lenses 116 and 138 of the rectifier groups introduce positive rotations similar in direction and amount, which are reversed from positive to negative inclination azimuths by the half-wave retardation elements 120 and 134. At the same time the retardation plates 122 and 132 are selected and oriented to introduce corresponding reverse or "negative" amounts of ellipticity, and the negative rotation and ellipticity thus produced compensate for those introduced by the condenser and objective lens systems and other elements. The entire system thus transmits substantially plane polarized light to the analyzer 142, greatly reducing the stray light transmitted, substantially increasing the extinction factors attainable, and thereby improving the effectiveness of such polarized light optical systems.

The elements of rectifier group 113 are designed to produce substantially the same kind and amount of positive rotary depolarization at each point in the aperture as that produced by the adjacent condenser or objective lens system, in the manner described in the above-mentioned Hyde-Inoué patent. As there explained, a low-power meniscus lens such as air lens 116 is preferred for this purpose, this air lens preferably being formed by a plano-concave element 114 and an adjacent plano-convex element 118. The non-central areas of the curved surfaces of these elements forming the air lens, being inclined relative to the light rays passing therethrough, introduce varying amounts of rotation in the various light rays filling the aperture, and the curvature and axial position of the air lens may be selected to provide amounts of rotation closely corresponding to those produced by the adjacent condenser lens system 124 and other light-modifying elements to be compensated. Axial adjustment varies this relative inclination because the rays are diverging slightly between the source 110 and the condenser 124. Such an air lens produces only a small change in magnification, because the convex and concave surfaces of elements 114 and 118 are substantially parallel and in close proximity, and the plane surfaces of these elements are also substantially parallel. As shown in the above-mentioned Hyde-Inoué patent, the low-power meniscus lens may be a thin glass lens if desired in certain applications.

In rectifier group 135, a second air lens 138, formed between plano-convex element 136 and plano-concave element 140 is selected and axially adjusted to introduce similar amounts of rotation corresponding to those introduced by the objective lens system 130 and associated elements.

As stated above, the rotation introduced by each rectifier group for each ray is in the same rotational direction as that introduced by the lens system to be compensated, and the half-wave retardation elements 120 and 134 are employed to reverse the inclination azimuths of these rotations so that they will cancel the rotations to be compensated.

The operation of the half-wave retardation elements 120 and 134 will be understood by reference to FIGURES 5, 6 and 7 where the action of a half-wave retardation plate 73 of a birefringent material such as calcite is illustrated. A ray of incident plane polarized light having an inclined azimuth is represented by the sine-wave vibration 74 shown in perspective in FIGURE 5, and shown as a double arrow 74 in the "end view" of FIGURE 6, which shows the projection of the vibration 74 on a plane normal to the axis of the ray. Incident wave 74 may be regarded as the resultant of an incident component wave 70 in the vertical plane defined by the "fast axis" 75 of plate 73, in phase with another incident component wave 72 in the normal plane corresponding to the "slow axis" of the half-wave plate 73. After passing through plate 73, as shown at the right-hand side of FIGURE 5, emergent component wave 72a has been retarded in phase by one-half wavelength relative to emergent component wave 70a. This half-wave relative retardation is caused by the birefringent properties of the half-wave plate 73, as described above. As shown in FIGURES 6 and 7, the amplitudes of the components 70 and 72 are substantially unchanged by the plate 73, but the half-wave retardation produced by the plate has the effect of reversing the $+\alpha$ inclination of incident resultant wave 74, so that the emergent resultant wave 74a has a $-\alpha$ inclination from the plane of component 70. If principal axis 75 is the slow axis of plate 73, the same half-wave relative retardation effect will be produced, and the choice of the principal axis to be oriented parallel to the plane of component wave 70 is therefore immaterial.

The effect of such a half-wave retardation element upon elliptically polarized light is shown in FIGURES 8, 9 and 10. Incident components 76 and 78, respectively parallel and normal to fast axis 77 of half-wave plate 81, are shown in FIGURE 8 to be out of phase by a phase difference of $180° + \zeta$. The resultant incident light 80 is "right elliptically" polarized, with right-handed ellipticity, as shown in FIGURE 9, with the major axis of the ellipse inclined at an azimuth of $\alpha$ from the plane of component 76. After passing through plate 81, "slow" component 78a has been retarded by one-half wavelength or 180°, producing a phase difference of $\zeta$ relative to "fast" component 76a, and the resultant emergent light is "left elliptically" polarized, with left-handed ellipticity, and with the major axis of the ellipse inclined at an azimuth of $-\alpha$ from the plane of component 76a as shown in FIGURE 10.

Thus, a shown in FIGURES 5 through 10, the action of a half-wave retardation element is to "reverse" both rotations and ellipticities but to leave the magnitudes of the effects unchanged.

The ellipticity compensating means of the present invention preferably take the form of phase retardation plates 122 and 132, as shown in FIGURE 1. The orientation and action of the retardation elements 122 and 132 in compensating for ellipticity can best be understood if the effects of a retardation plate providing a small retardation $\zeta$ upon various pairs of plane polarized components are considered, as illustrated by the vector diagrams of FIGURES 11–25. These figures illustrate the effect upon polarized light of a retardation element providing less than a quarter-wavelength of relative retardation.

In FIGURE 11, two incident rays are shown, one ray 86 with components 82 and 84 passing through a peripheral point 83 in the upper right quadrant of a retardation plate 87 providing a relative retardation $\zeta$ between the two components, and the other ray 92 with components 88 and 90 passing through another peripheral point 85 in the lower right quadrant of the plate 87. Components 88 and 90 are shown to be in phase, producing an inclination azimuth $-\alpha$ of the polarization plane of the resultant plane-polarized wave 92 (FIGURE 14). Components 82 and 84 are shown to be 180° out of phase, producing plane-polarized resultant 86 inclined at an azimuth $\alpha$ (FIGURE 12). In each case the angle $\alpha$ is a small angle as measured from the plane of the fast axis 89 of the plate 87. If the birefringent retardation plate 87 provides a small retardation $\zeta$ (e.g., a retardation in the neighborhood of 10° to 20°) of the slow components 84 and 90 relative to the fast components 82 and 88, the emergent slow components will be retarded by the amount $\zeta$, as illustrated at the right-hand side of FIGURE 11. The resultant emergent ray 86a is therefore left elliptically polarized, with an inclination $+\alpha$ (FIGURE 13), and resultant emergent ray 92a is right elliptically polarized at an inclination $-\alpha$ (FIGURE 15).

The effect of such a plate upon rays of plane polarized light inclined at small angles from the slow axis 91a of a similar plate 87a is shown in FIGURES 16 through 20. In FIGURE 16, plate 87a is shown with its fast axis 89a oriented perpendicular to the plane of incident components 82 and 88, so that the inclination angles $+\alpha$ and $-\alpha$ are now small angles measured from the slow axis 91a of plate 87a, slow axis 91a being normal to fast axis 89a, and parallel to the planes of incident components 82 and 88. Since vertical emergent components 82b and 88b are now retarded by the plate's small phase retardation $\zeta$ relative to horizontal emergent components 84b and 90b, the new emergent resultant 86b is right elliptically polarized (FIGURE 18) while the new emergent resultant 92b is left elliptically polarized (FIGURE 20). For small retardations $\xi$, however, the principal axis of the ellipse is inclined at approximately the same azimuth as that of the incident resultant ray, as can be seen by comparing FIGURES 17 through 20.

The comparison of FIGURE 13 with FIGURE 18, and of FIGURE 15 with FIGURE 20, shows that interchanging the positions of the fast and slow axes of plate 87 merely has the effect of reversing the sign of the resulting ellipticity produced by the plate.

The operation of the retardation plate in cancelling or compensating for incident ellipticity is illustrated in FIGURES 21 through 25. In FIGURE 21, two rays are shown passing respectively through peripheral points 93 and 99 in the upper left and lower left quadrants of a retardation plate 95 having its fast axis 97 vertical and providing a small relative phase retardation $\xi$ between the fast and slow components transmitted therethrough. The incident ray 98 (FIGURE 22) is right elliptically polarized with an inclination azimuth of $+\alpha$, ray 98 being the resultant of an incident component 94 vibrating in the plane of the plate's fast axis 97, and a normal incident component 96 out of phase with component 94 by a phase difference of $180° + \xi$ (FIGURE 21). Similarly, the left elliptically polarized ray 104 (FIGURE 24) is the resultant of an incident component 100 parallel to fast axis 97 and a normal incident component 102 out of phase with component 100 by a phase difference of $\xi$ (FIGURE 21), with the major axis of the ellipse inclined at $-\alpha$ (FIGURE 24). After passing through retardation plate 95, the slow components are each retarded by the plate's retardation $\xi$ relative to the respective fast components 94a and 100a. This retardation brings emergent component 102a into phase with emergent component 100a (FIGURE 21) so that resultant 104a is plane polarized at an azimuth of $-\alpha$ (FIGURE 25); correspondingly, emergent component 96a is brought 180° out of phase with emergent component 94a (FIGURE 21) producing plane polarized resultant 98a inclined at an azimuth of $+\alpha$ (FIGURE 23). Thus if plate 95 is selected to provide a phase retardation $\xi$ of the horizontal vibration relative to the vertical vibration, the two elliptically polarized incident rays 98 and 104 are both converted to plane-polarized emergent rays 98a and 104a.

From an inspection of FIGURES 21-25, it is apparent that if incident component 102 were out of phase by $-\xi$ with respect to component 100, and if incident component 96 were out of phase by $180° - \xi$ with respect to component 94, a retardation plate 95 introducing a phase retardation $\xi$ of the horizontal components relative to the vertical components would increase the elliptical polarization, since the emergent phase differences will be $2\xi$ between components 102a and 100a, and $180° - 2\xi$ between components 96a and 94a. If plate 95 is physically rotated 90°, however, the opposite component of each pair will be retarded, eliminating the ellipticity. Such 90° rotation may therefore be said to change the plate's retardation from $\xi$ to $-\xi$.

The function of retardation elements providing small phase retardations is thus the introduction of preselected kinds and amounts of ellipticity, and such elements are employed in the optical systems of the present invention to cancel or compensate for undesired ellipticity effects such as those introduced by the low reflection coatings of the other optical elements of the systems.

Returning to the optical system shown schematically in FIGURE 1, the function of the various elements in compensating for undesired rotations and ellipticities can best be understood by referring to FIGURES 26-29. If the light incident upon objective 130 is assumed to be plane-polarized throughout the aperture, the coated optical elements of objective 130 will introduce varying amounts of rotation and ellipticity, so that the polarization diagrams of rays passing through various points in the transverse plane A—A are ellipses of different inclinations, as indicated qualitatively in FIGURE 26. As mentioned above, rays passing through peripheral points on the 45° axes, such as rays 50A and 58A, will have maximum amounts of undesired rotation and ellipticity, while rays closer to the axis parallel to the original polarization plane (defined by the points 46 and 54 in FIGURE 26) or closer to the normal axis (defined by the points 48, 46 and 60 in FIGURE 26) will have lesser amounts of rotation and ellipticity as shown for rays 52A and 56A in FIGURE 26. The direction of rotation and ellipticity are opposite in adjacent quadrants, but otherwise these undesirable effects are substantially symmetrical. The maximum effects occurring at the peripheral 45° points produce maximum transmitted intensities at these points when the analyzer is crossed with respect to the polarizer, and this explains why the crossed analyzer produces the polarization cross shown in FIGURE 4, with the light areas surrounding these peripheral 45° points.

Figure 27:
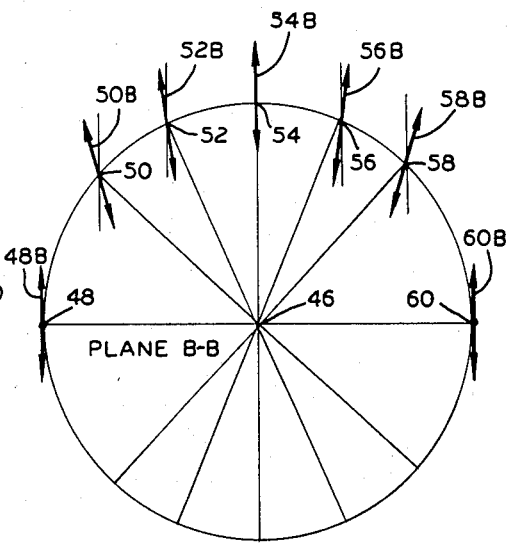

If retardation element 132 is designed to introduce exactly equal and opposite ellipticity at each point in the aperture, the polarization diagrams for the various rays emerging from element 132 and passing through plane B—B will be those shown in FIGURE 27, where all of the elliptically depolarized rays of FIGURE 26 are shown converted to rotated plane polarized rays. It will be seen that excellent results are obtained with retardation plates of uniform thickness providing equal small amounts of retardation over the aperture. Thus, for a 97-power strain-free coated microscope objective, a retardation plate providing a uniform phase retardation $\zeta = 15.1° \pm 4.3°$ provides elliptical compensation of approximately 92% effectiveness. The selection of such uniform retardations $\zeta$ for particular systems is fully described below.

Referring again to FIGURE 1, light rays passing through retardation element 132 and plane B—B are directed through half-wave retardation element 134, where the inclinations of each plane polarized ray are reversed, as described above, and illustrated in FIGURE 28, showing the polarization planes of various rays passing through the plane C—C in FIGURE 1. These rays are then directed through rectifier elements 136 and 140, and air lens 138 therebetween introduces rotary polarizations generally equivalent to those introduced by the objective 130, thus compensating for these rotations and producing at plane D—D light polarized in substantially parallel planes throughout the aperture, as shown in FIGURE 29. This light may then be blocked effectively by crossed analyzer 142, and the substantial elimination of stray light by the compensating elements thus permits more effective blocking or extinction by analyzer 142 than that achieved in uncompensated systems.

The action of the various elements is best shown by tracing the polarization of a single ray through FIGURES 26, 27, 28 and 29. For example, ray 50A in FIGURE 26 is right elliptically polarized, with a major axis inclined at $+\alpha$ from the vertical. This ray therefore corresponds to ray 98 in FIGURE 22. If retardation element 132 has its fast axis oriented vertically, it has the effect of converting the elliptically polarized ray 50A to a plane polarized ray 50B (FIGURE 26) inclined at about $+\alpha$, corresponding to ray 98a shown in FIGURE 23, thus compensating for the ellipticity introduced in objective 130. Ray 50B then has its $+\alpha$ angle of inclination reversed to $-\alpha$ by half-wave retardation element 134, as shown by ray 50C in FIGURE 28. The rectifier elements 136 and 138 then provide a rotation of $\alpha$, restoring ray 50C to a vertically plane polarized ray 50D at plane D—D, as shown in FIGURE 29.

Figure 28:
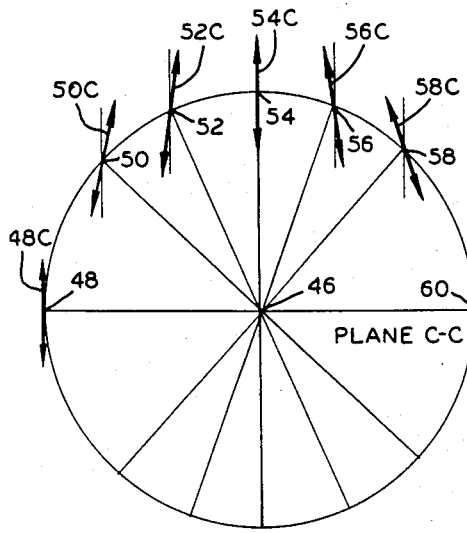
Figure 29:
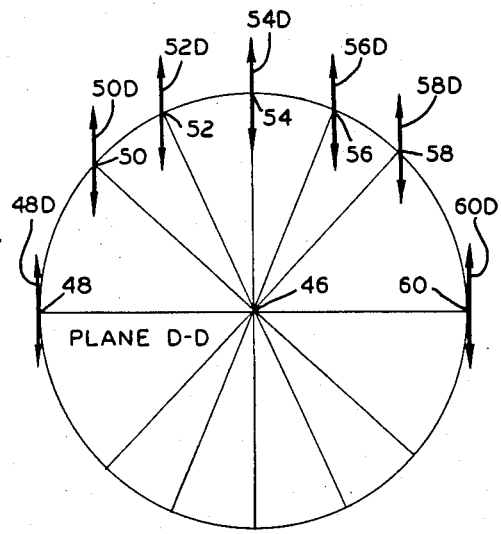

The same compensations are also performed for the other rays, such as rays 52A, 56A and 58A in FIGURE 26, as shown in FIGURES 27, 28 and 29.

Figures 30, 31:
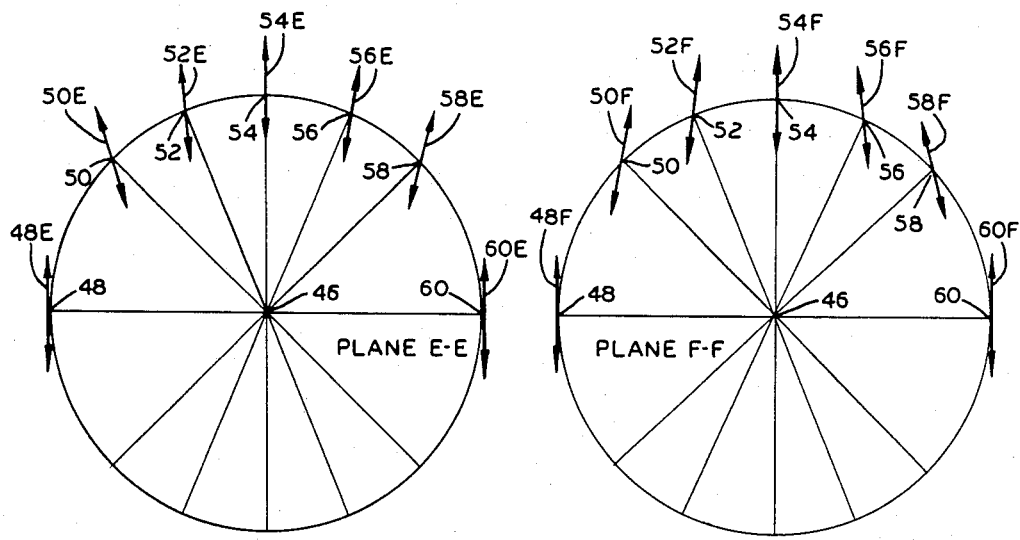
Figures 32, 33:
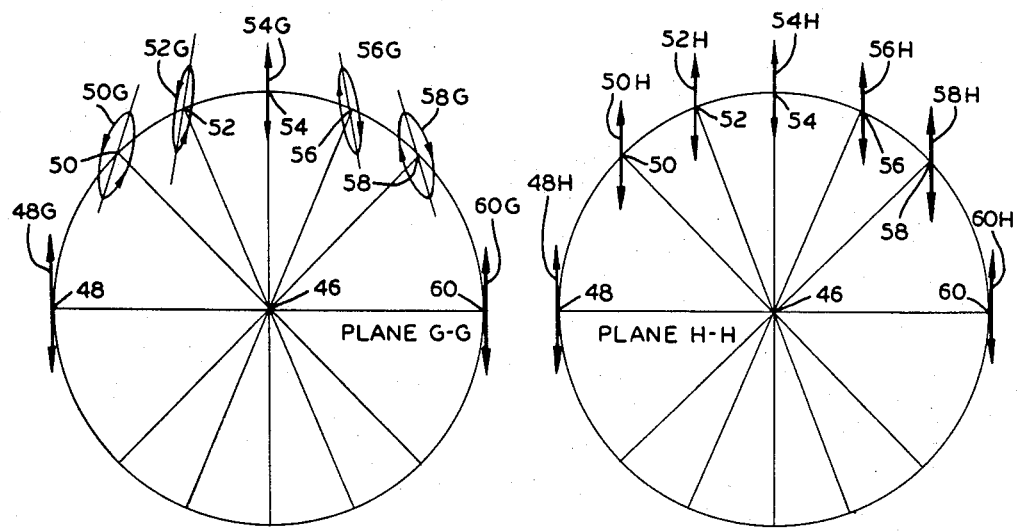

The compensating effects of elements 114, 118, 120 and 122 (shown in FIGURE 1) are similarly illustrated in FIGURES 30, 31, 32 and 33. If polarizer 112 in FIGURE 1 is adjusted to polarize in vertical planes the light from source 110, this light then passes through rectifying elements 114 and 118, with air lens 116 therebetween introducing varying amounts of rotation at plane E—E, as shown in FIGURE 30. Half-wave retardation plate 120 then reverses the azimuths of all such rotated rays at plane F—F, as shown in FIGURE 31. The retardation element 122 converts these rotated rays into elliptically polarized rays at plane G—G, as shown in FIGURE 32, and the rays of light incident upon condenser 124 are thus depolarized with varying negative amounts of rotation and ellipticity, which are cancelled by the positive rotation and ellipticity introduced by the condenser, producing at plane H—H light substantially plane-polarized in parallel planes over the aperture, as shown in FIGURE 33.

The effect of retardation plate 122 on a single ray, such as ray 58F (FIGURE 31), is similar to that shown in FIGURES 16–18, where plane polarized ray 86 is converted to a right elliptically polarized ray 86b by a plate of retardation ζ with its fast axis 89a oriented at 90° from the vertical. Ray 58G in FIGURE 32 thus corresponds to ray 86b in FIGURE 18.

Plate 122 therefore has its fast axis displaced 90° from the polarization plane of polarizer 112, although plate 132 has its fast axis parallel to this polarization plane as mentioned above. If a thicker plate 122 is employed, so that the retardation of plate 122 is increased to 360°—ζ, the plate provides the equivalent of a phase retardation of —ζ. Such a retardation (or a retardation of N.360°—ζ, where N is any integer), is the equivalent of the 90° difference in orientation mentioned above. Thus plates 122 and 132 are selected so that plate 122 introduces a retardation ζ of the vertical component relative to the horizontal component while plate 132 introduces a retardation —ζ of the vertical component relative to the horizontal component.

For half-wave retardation elements 120 and 134 in FIGURE 1, as explained above, the choice of the principal axis to be oriented parallel to the polarization plane of polarizer 112 is not material, since these elements will perform their rotation function if either the fast or the slow axis is oriented in this position. For the elements 122 and 132, however, the orientation of the fast axis at 0° or 90° is directly related to the performance of the elements, as shown above.

In the system of FIGURE 2, the elements 160 and 170 may have a variety of retardation values and orientations, as shown in Table I, where λ is the substantially monochromatic wavelength of source 150; ζ$_1$ is the small retardation selected as hereinafter described for elliptical compensation of the condenser 162 and associated optical elements; β is the angular orientation of the fast axis of element 160 with respect to the polarization plane of polarizer 152; ζ$_2$ is the small retardation selected for elliptical compensation of the objective 168 and associated optical elements; and γ is the angular orientation of the fast axis of element 170 with respect to the polarization plane of polarizer 152:

*Table I*

| Case | Retardation of Element 160 | β, degrees | Retardation of Element 170 | γ, degrees |
|---|---|---|---|---|
| 1 | λ/2−ζ$_1$ | 90 | λ/2+ζ$_2$ | 90 |
| 2 | λ/2+ζ$_1$ | 0 | λ/2−ζ$_2$ | 0 |
| 3 | λ/2−ζ$_1$ | 90 | λ/2−ζ$_2$ | 0 |
| 4 | λ/2+ζ$_1$ | 0 | λ/2+ζ$_2$ | 90 |
| 5 | λ/2 | 90 | λ/2+ζ$_1$+ζ$_2$ | 90 |
| 6 | λ/2 | 0 | λ/2−ζ$_1$−ζ$_2$ | 0 |
| 7 | λ/2 | 90 | λ/2−ζ$_1$−ζ$_2$ | 0 |
| 8 | λ/2 | 0 | λ/2+ζ$_1$+ζ$_2$ | 90 |
| 9 | λ/2−ζ$_1$−ζ$_2$ | 90 | λ/2 | 90 |
| 10 | λ/2+ζ$_1$+ζ$_2$ | 0 | λ/2 | 0 |
| 11 | λ/2−ζ$_1$−ζ$_2$ | 90 | λ/2 | 0 |
| 12 | λ/2+ζ$_1$+ζ$_2$ | 0 | λ/2 | 90 |
| 13 | 0 |  | λ/2+½(ζ$_1$+ζ$_2$) | 90 |
| 14 | 0 |  | λ/2−½(ζ$_1$+ζ$_2$) | 0 |

In the first four combinations shown in Table I, cases 1, 2, 3 and 4, rectification of ellipticity is accomplished separately in the condenser and objective systems. In cases 5, 6, 7 and 8, rectification of ellipticity is accomplished entirely in the objective system, between the specimen 166 and the eyepiece 180 in FIGURE 2. In cases 9, 10, 11 and 12, all rectification of ellipticity is completed in the condenser system, between polarizer 152 and specimen 166. In the last two combinations, cases 13 and 14, element 160 is eliminated entirely, and all rectification of ellipticity is accomplished in the objective system.

All of the combinations shown in Table I are entirely feasible, but those in which β=γ (i.e., cases 1, 2, 5, 6, 9 and 10) are preferred when elements 160 and 170 are composed of half-wave plates cemented to separate phase retardation plates because the use of substantially identical half-wave plates with parallel fast axes in the two elements 160 and 170 permits significantly relaxed manufacturing tolerances for the half-wave plates, and also allows a greater range of wavelengths to be used.

The reason that a single retardation plate can produce correction over the whole aperture is as follows. The elliptical polarization introduced (or removed) by the plate depends on the angle between the plate's fast axis and the plane of the incident polarized light. (If the incident light is elliptically polarized, this angle is measured to the major axis of the ellipse.) It is experimentally observed that at points in the aperture where the elliptical polarization produced by the objective is large, the rotation of the plane of polarization produced by the objective is also high. Therefore, the elliptical polarization introduced (or removed) by the retardation plate will be large at these points, as desired.

In the second and fourth quadrants the rotation is reversed, so also is the elliptical polarization introduced (or removed) by the retardation plate.

The procedure for determining the appropriate retardation ξ for a given objective or condenser system falls into two steps. The first is to determine the amounts of rotation and ellipticity introduced by the objective. The second is to calculate the desired retardation for the rectifying plate. The first step can be accomplished in principle either theoretically or experimentally.

The theoretical approach would be to perform a ray tracing for several rays from an axial object point. Then for a particular ray the ratio of amplitudes and phase difference produced on transmission should be calculated for each surface, coated or uncoated. For example, the ratio of amplitudes at the "i-th" surface would be $$\nu_i = k_s / k_p$$

and the phase difference would be $\Omega_i = \omega_s - \omega_p$ where $k_s$ and $\omega_s$ represent the amplitude transmittance and phase retardation respectively for the perpendicular component. Finally the effect of the whole objective is calculated by multiplying together all the amplitude ratios and adding up all the phase differences:

$$\nu_T = \prod_{i=1}^{m} \nu_i$$

$$e = \sum_{i=1}^{m} \Omega_i$$

Each of the quantities is a function of the numerical aperture, ρ, and the azimuth angle, φ. Along the diagonal azimuth, φ=45°, the amplitude ratio $\nu_T$ is related to the rotation, R, as follows:

$$\nu_T = \tan(45° - R) \quad (1)$$

where R is the angular rotation of the plane of polarization introduced by the objective, corresponding to the angle α in FIGURE 26, for example.

The quantities R and e can be measured experimentally, if desired, determining the value of R as a function of numerical aperture, ρ, for the diagonal azimuth, φ=45°.

If elliptical polarization is present, due to lens coatings or strain, the dark part of the polarization across (FIGURE 4) will not be completely black. The extinction can be restored by inserting a compensating plate of retardation δ and turning it to the appropriate angle, β. The angle β is measured from the fast axis of the compensating plate to the plane of polarization of the emerging light.

The phase difference between the parallel and perpendicular components is then given by $e=2\beta \tan \delta$. When the polarizer (or analyzer) is turned to a new value, the arms of the cross will move toward or away from the center and the phase difference will have a different value.

As a result of either the measurements or the theory, one has the functions $R=R(\rho)_{\phi=45°}$ and $e=e(\rho)_{\phi=45°}$ which are shown in the form of graphs in FIGURE 3.

In order to select an optimum value for $\xi$, the values of R and e are noted for an arbitrary value of $\rho$, say 0.7 of the total numerical aperture of the objective. The retardation $\xi$ of a plate which will remove the ellipticity is calculated from the equation $$\tan \xi = \frac{e}{2R} \qquad (2)$$

In principle, the retardation plate will provide exactly the correct ellipticity compensation for only one ray, namely that on the azimuth $\phi=45°$ at the aperture $\rho$ used in selecting R and e. However, the retardation plate performs quite well over the entire aperture. The functions R and e may vary in different ways for different light focusing system, changing the positions of the curves of FIGURE 3. From the form of these curves, however, it can be observed that a value of $\rho$ between approximately 0.5 and 0.9 of the total numerical aperture, and a value of $\phi$ between approximately 30° and 60° will generally produce a suitable value for $\xi$. The approximate area in which such selected points fall is designated A in FIGURE 4, where area A is seen to be centrally located in a light or "depolarized" area between the arms of the polarization cross.

Table II shows the rotation, R, measured along the 45° azimuth of a commercial 97X coated objective. In the second column is the measured phase difference between the components parallel and perpendicular to the plane of incidence. In the third column is the phase difference between the parallel and perpendicular components introduced by a 15.1° retardation plate with its fast axis parallel to the original plane of polarization. The residual phase difference is shown in the fourth column. Since the largest residual is 0.12°, the phase difference has been reduced by a factor of 1.48/.12=12.

Table II

| Rotation R, degrees | Phase difference $e$ (measured), degrees | Phase difference introduced $e'$, degrees | Residual phase difference $e'-e$, degrees |
|---|---|---|---|
| .5 | .38 | .26 | −.12 |
| 1.0 | .64 | .52 | −.12 |
| 1.5 | .88 | .78 | −.10 |
| 2.0 | 1.10 | 1.04 | −.06 |
| 2.5 | 1.30 | 1.30 | 0 |
| 3.0 | 1.48 | 1.56 | .08 |
| 4.0 | -------- | 2.08 | -------- |

The undesirable ellipticity produced in such a commercial 97-power objective is thus at least 92% compensated at all points over the aperture by a retardation element providing a uniform phase retardation over the aperture.

The present invention is well adapted for use in polarizing microscope systems such as those shown in FIGURES 1 and 2, and it is also useful in other optical apparatus employing polarized light in which undesirable depolarization effects introduced by the various elements of the system are to be compensated. As shown above, the present invention is particularly useful in compensating for rotations and ellipticities varying over the aperture, such as those introduced by inclined or curved surfaces or optical elements, and by low reflection coatings on such surfaces.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. In an optical system employing a beam of plane polarized light and including optical elements interposed in said beam which introduce undesirable elliptical polarization effects in said light in different amounts over different portions of the aperture, the improvement comprising an ellipticity compensator interposed in said beam and including a phase retarding element producing opposite elliptical polarization in an amount equal in phase difference but opposite in sign to that of the ellipticity introduced by said optical elements in a ray passing through an aperture point removed from the optical axis of said system by an amount between five-tenths and nine-tenths of the numerical aperture of said system along an azimuth inclined at an angle between 30° and 60° from the original polarization plane of said polarized light, whereby the elliptical polarization effects introduced by said optical elements at other aperture points are substantially reduced.

2. In an optical system employing a beam of plane polarized light and including optical elements interposed in said beam which introduce undesirable elliptical polarization effects in said light in different amounts over different portions of the aperture, the improvement comprising an ellipticity compensator interposed in said beam and including a phase retarding element producing opposite elliptical polarization in an amount equal in phase difference but opposite in sign to that of the ellipticity introduced by said optical elements in a ray passing through an aperture point removed from the optical axis of said system by approximately seven-tenths of the numerical aperture of said system along an azimuth inclined at approximately 45° from the original polarization plane of said polarized light, whereby the elliptical polarization effects introduced by said optical elements at other aperture points are substantially reduced.

3. In a microscope employing a beam of phase polarized light and having a light focusing system employing coated optical elements introducing undesirable polarization effects in said light the improvement comprising a compensating assembly including in combination a rectifier group of optical elements shaped to form a low power meniscus lens, a first phase retardation plate providing substantially one-half wavelength relative phase retardation between component light rays plane-polarized parallel to its principal axes, and a second phase retardation plate providing relative phase retardation of less than one-quarter wavelength between component light rays plane-polarized parallel to its principal axes, said rectifier group of optical elements and both of said retardation plates being interposed in the path of said beam adjacent said coated optical elements with said first retardation plate being positioned between said meniscus lens and said coated elements, and each of said plates being formed of birefringent material and having one of its principal axes oriented substantially parallel to the original polarization plane of said polarized light, whereby undesirable polarization effects introduced by said coated optical elements are substantially eliminated.

4. The combination defined in claim 3 in which said first and second retardation plates are secured together to form a single retardation element.

5. In a microscope employing a beam of plane polarized light and having a light focusing system employing coated optical elements introducing undesirable polarization effects in said light, the improvement comprising a compensating assembly including in combination a rectifier group of optical elements shaped to form a low power meniscus lens, a substantially half-wave phase retardation plate, and a second phase retardation plate providing between 10° and 20° relative phase retardation between component light rays plane-polarized parallel to its principal axes, said rectifier group of optical elements and both of said retardation plates being interposed in the path of said beam adjacent said coated optical elements with said half-wave retardation plate being positioned between said meniscus lens and said coated elements, and each of said plates being formed of birefringent material and having one of its principal axes oriented substantially parallel to the original polarization plane of said polarized light, whereby the undesirable polarization effects introduced by said coated optical elements are substantially eliminated.

6. The combination defined in claim 5 characterized by a unitary structural combination of said half-wave plate and said second phase retardation plate.

7. In a microscope employing a beam of plane polarized light and having light focusing system employing coated optical elements introducing undesirable polarization effects in said light, the improvement comprising a compensating assembly including in combination a rectifier group of optical elements shaped to form a low power meniscus lens and phase retardation plate providing relative phase retardation different from one-half wavelength and falling substantially between one-quarter wavelength and three-quarters wavelength, said rectifier group of optical elements and said retardation plate being interposed in the path of said beam adjacent said coated optical elements with said phase retardation plate being positioned between said meniscus lens and said coated elements, and said plate being formed of birefringent material and having one of its principal axes oriented substantially parallel to the original polarization plane of said polarized light, whereby undesirable polarization effects introduced by said coated optical elements are substantially eliminated.

8. In a microscope employing a beam of plane polarized light and having a light focusing system employing coated optical elements introducing undesirable polarization effects in said light, the improvement comprising a compensation assembly including in combination a rectifier group of optical elements shaped to form a low power meniscus lens, and a phase retardation plate providing relative phase retardation between component light rays plane-polarized parallel to its principal axes in an amount different from 180° and falling substantially between 140° and 220°, said rectifier group of optical elements and said plate being interposed in the path of said beam adjacent said coated optical elements with said phase retardation plate being positioned between said meniscus lens and said coated elements, and said plate being formed of birefringent material and having one of its principal axes oriented substantially parallel to the original polarization plane of said polarized light, whereby undesirable polarization effects introduced by said coated optical elements are substantially compensated.

9. In a microscope employing a beam of plane polarized light and having a light focusing system employing coated optical elements introducing undesirable polarization effects in said light, the improvement comprising a compensating assembly including in combination a rectifier group of optical elements shaped to form a low power air lens, and a phase retardation plate providing relative phase retardation between component light rays plane-polarized parallel to its principal axes in an amount different from 180° and falling substantially between 160° and 200°, said rectifier group of optical elements and said plate being interposed in the path of said beam adjacent said coated optical elements with said phase retardation plate being positioned between said air lens and said coated elements, and said plate being formed of birefringent material and having one of its principal axes oriented substantially parallel to the original polarization plane of said polarized light, whereby undesirable polarization effects introduced by said coated optical elements are substantially compensated.

10. In an optical system employing a beam of polarized light and including optical elements introducing undesirable ellipticities in said light, an ellipticity compensator including a phase retarding element providing substantially uniform relative phase retardation over the aperture of said system in an amount equal in value but opposite in sign to that corresponding to the undesired ellipticity introduced by said optical elements in a ray passing through an aperture point removed from the optical axis of said system by an amount between five-tenths and nine-tenths of the numerical aperture of said system along an azimuth inclined at an angle between 30° and 60° from the original polarization plane of said polarized light, whereby the ellipticities introduced by said optical elements are substantially reduced.

11. In an optical system employing a beam of polarized light and including optical ements introducing undesirable ellipticities in said light, an ellipticity compensator including a phase retardation plate providing substantially uniform relative phase retardation over the aperture in an amount equal in value and opposite in sign to the undesirable ellipticity introduced by said optical elements in a ray passing through an aperture point removed from the optical axis of said system by approximately seven-tenths of the numerical aperture of said systems along an azimuth inclined at approximately 45° from the original polarization plane of said polarized light, whereby the ellipticities introduced by said optical elements are substantially reduced.

12. In an optical system employing a beam of plane polarized light and including optical elements introducing undesirable rotations and ellipticities in said light, the compensating assembly interposed in said beam and comprising in combination, a group of rectifier elements, shaped to form a low-power meniscus lens positioned adjacent said optical elements and producing in said beam corresponding amounts of rotation; a half-wave retardation element adapted to reverse the inclinations of such rotations with respect to the original polarization plane of said beam and positioned between said optical elements and said group of rectifier elements; and a phase retarding element providing substantially uniform relative phase retardation over the aperture of said system in an amount equal in value but opposite in sign to that corresponding to the undesirable ellipticity introduced by said optical elements in a ray passing through an aperture point removed from the optical axis of said system by an amount between five-tenths and nine-tenths of the numerical aperture of said system along an azimuth inclined at an angle between 30° and 60° from the original polarization plane of said polarized light, whereby the rotations and ellipticities introduced by said optical elements are substantially reduced.

13. In an optical system employing a beam of plane polarized light and including optical elements introducing undesirable rotations and ellipticities in said light, a compensating assembly interposed in said beam and comprising in combinaton, rectifier means forming a low-power meniscus lens positioned adjacent said optical elements and producing in said beam corresponding amounts of rotation; a half-wave retardation element adapted to reverse the inclinations of such rotation with respect to the original polarization plane of said beam and positioned between said rectifier means and said optical elements and a phase retardation plate providing substantially uniform relative phase retardation over the aperture of said system in an amount equal in value and opposite in sign to those corresponding to the undesirable ellipticity introduced by said optical elements in a ray passing through an aperture point removed from the optical axis of said system by approximately seven-tenths of the numerical aperture of said system along an azimuth inclined at approximately 45° from the original polarization plane of said polarized light, whereby the rotations and ellipticities introduced by said optical elements are substantially reduced.

14. In an optical instrument employing a beam of monochromatic plane polarized light of a wavelength $\lambda$ and including two light-focusing systems interposed in said beam and introducing undesirable rotations and ellipticities in said beam, two compensator assemblies, each positioned adjacent one of said light-focusing systems and each comprising in combination a rectifier group of light-modifying elements forming a low-power meniscus lens interposed in said beam and producing corresponding rotations, and a phase retardation element interposed in said beam adjacent each said rectifier group, the first of said retardation elements providing a phase retardation A and having its fast axis oriented at an angle $\beta$ with respect to the original polarization plane of said light, and the second of said retardation elements providing a phase retardation B and having its fast axis oriented at an angle $\gamma$ with respect to said polarization plane, in which the associated values of A, B, $\beta$ and $\gamma$ are selected from one of the lines of the following table, where $\xi_1$ and $\xi_2$ are the phase differences equal in value but opposite in sign to those corresponding to the ellipticities produced respectively by the first and the second of said light-focusing systems for a ray passing through a preselected non-axial aperture point of said combination of systems:

| A | $\beta$, degrees | B | $\gamma$, degrees |
|---|---|---|---|
| $\lambda/2-\xi_1$ | 90 | $\lambda/2+\xi_2$ | 90 |
| $\lambda/2+\xi_1$ | 0 | $\lambda/2-\xi_2$ | 0 |
| $\lambda/2-\xi_1$ | 90 | $\lambda/2-\xi_2$ | 0 |
| $\lambda/2+\xi_1$ | 0 | $\lambda/2+\xi_2$ | 90 |
| $\lambda/2$ | 90 | $\lambda/2+\xi_1+\xi_2$ | 90 |
| $\lambda/2$ | 0 | $\lambda/2-\xi_1+\xi_2$ | 0 |
| $\lambda/2$ | 90 | $\lambda/2-\xi_1-\xi_2$ | 0 |
| $\lambda/2$ | 0 | $\lambda/2+\xi_1+\xi_2$ | 90 |
| $\lambda/2-\xi_1-\xi_2$ | 90 | $\lambda/2$ | 90 |
| $\lambda/2+\xi_1+\xi_2$ | 0 | $\lambda/2$ | 0 |
| $\lambda/2-\xi_1-\xi_2$ | 90 | $\lambda/2$ | 0 |
| $\lambda/2+\xi_1+\xi_2$ | 0 | $\lambda/2$ | 90 |

15. The combination defined in claim 14 in which said non-axial point is removed from the optical axis of said system by an amount between five-tenths and nine-tenths of the numerical aperture of said system along an azimuth inclined at an angle between 30° and 60° with respect to said polarization plane.

16. The combination defined in claim 14 in which said non-axial point is removed from the optical axis of said system by approximately seven-tenths of the numerical aperture of said system along an azimuth inclined at approximately 45° from said polarization plane.

17. In an optical instrument employing a beam of monochromatic plane polarized light of a wavelength $\lambda$ and including two light-focusing systems interposed in said beam and introducing undesirable rotations and ellipticities in said beam, two compensator assemblies each positioned adjacent one of said light-focusing systems and each comprising in combination a rectifier group of light-modifying elements forming a low-power maniscus lens interposed in said beam and producing corresponding rotations, and a phase retardation element interposed in said beam adjacent each said rectifier group, the first of said retardation elements providing a phase retardation A and having its fast axis oriented at an angle $\beta$ with respect to the original polarization plane of said light, and the second said retardation element providing a phase retardation B and having its fast axis oriented at an angle $\gamma$ with respect to said polarization plane, in which the associated values of A, B, $\beta$ and $\gamma$ are selected from one of the lines of the following table, where $\xi_1$ and $\xi_2$ are the phase differences equal in value but opposite in sign to those corresponding to the ellipticities produced respectively by the first and the second of said light-focusing systems for a ray passing through a preselected non-axial aperture point of said combination of systems:

| A | $\beta$, degrees | B | $\gamma$, degrees |
|---|---|---|---|
| $\lambda/2-\xi_1$ | 90 | $\lambda/2+\xi_2$ | 90 |
| $\lambda/2+\xi_1$ | 0 | $\lambda/2-\xi_2$ | 0 |
| $\lambda/2$ | 90 | $\lambda/2+\xi_1+\xi_2$ | 90 |
| $\lambda/2$ | 0 | $\lambda/2-\xi_1-\xi_2$ | 0 |
| $\lambda/2-\xi_1-\xi_2$ | 90 | $\lambda/2$ | 90 |
| $\lambda/2+\xi_1+\xi_2$ | 0 | $\lambda/2$ | 0 |

18. The combination defined in claim 17 in which said non-axial point is removed from the optical axis of said system by an amount between five-tenths and nine-tenths of the numerical aperture of said system along an azimuth inclined at an angle between 30° and 60° with respect to said polarization plane.

19. The combination defined in claim 17 in which said non-axial point is removed from the optical axis of said system by approximately seven-tenths of the numerical aperture of said system along an azimuth inclined at approximately 45° from said polarization plane.

20. In an optical instrument employing a beam of monochromatic plane polarized light of a wavelength $\lambda$ and including two light-focusing systems interposing in said beam and introducing undesirable rotations and ellipticities in said beam, the improvement comprising in combination a rectifier group of light-modifying elements forming a low-power meniscus lens interposed in said beam, positioned adjacent to one of said light-focusing systems and producing rotations corresponding to those produced by said system, and a phase retardation element interposed in said beam adjacent to said rectifier group, said retardation element providing a phase retardation B and having its fast axis oriented at an angle $\gamma$ with respect to the original polarization plane of said light, in which the associated values of B and $\gamma$ are selected from one of the lines of the following table, where $\xi_1$ and $\xi_2$ are the phase differences equal in value but opposite in sign to those corresponding to the ellipticities produced respectively by the first and the second of said light-focusing systems for a ray passing through a preselected non-axial aperture point of said combination of systems:

| B | $\gamma$, degrees |
|---|---|
| $\lambda/2+\frac{1}{2}(\xi_1+\xi_2)$ | 90 |
| $\lambda/2-\frac{1}{2}(\xi_1+\xi_2)$ | 0 |

21. The combination defined in claim 20 in which said non-axial point is removed from the optical axis of said system by an amount between five-tenths and nine-tenths of the numerical aperture of said system along an azimuth inclined at an angle between 30° and 60° with respect to said polarization plane.

22. The combination defined in claim 20 in which said non-axial point is removed from the optical axis of said system by approximately seven-tenths of the numerical aperture of said system along an azimuth inclined at approximately 45° from said polarization plane.

References Cited in the file of this patent

UNITED STATES PATENTS 2,303,906 Benford et al. _____ Dec. 1, 1942
2,936,673 Hyde et al. _____ May 17, 1960

FOREIGN PATENTS 643,048 Great Britain _____ Sept. 15, 1950

UNITED STATES PATENT OFFICE
CERTIFICATE OF CORRECTION

Patent No. 3,052,152                          September 4, 1962

Charles J. Koester

It is hereby certified that error appears in the above numbered patent requiring correction and that the said Letters Patent should read as corrected below.

Column 5, line 51, for "gerater" read -- greater --; column 14, line 49, for "phase" read -- plane --; column 16, line 24, for "ements" read -- elements --; column 17, lines 65 and 66, for "maniscus" read -- meniscus --.

Signed and sealed this 26th day of February 1963.

(SEAL)
Attest:

ESTON G. JOHNSON                                                DAVID L. LADD
Attesting Officer                                                      Commissioner of Patents